Dec. 28, 1954   W. N. McINTOSH ET AL   2,697,972
ROTARY TYPE CULTIVATOR IMPLEMENT
Filed May 13, 1949   3 Sheets-Sheet 1

Inventors
W. N. McIntosh
G. E. Ataya
N. A. Corban

Inventors
W. N. McIntosh
G. E. Ataya
N. A. Corban

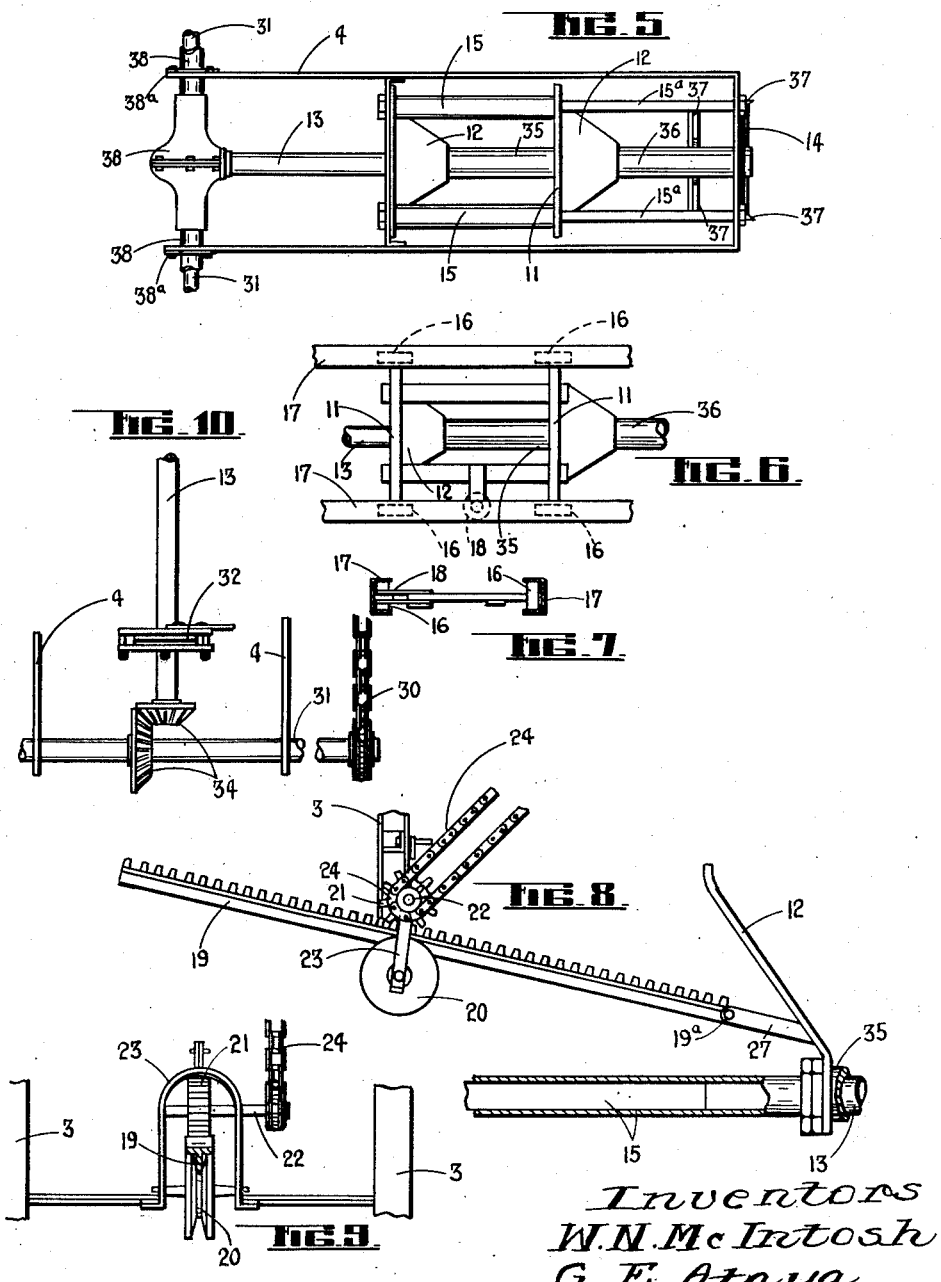

United States Patent Office 2,697,972
Patented Dec. 28, 1954

2,697,972

ROTARY TYPE CULTIVATOR IMPLEMENT

William Neil McIntosh, George Elias Ataya, and Najib Assid Corban, Henderson, Auckland, New Zealand, assignors to A. A. Corban & Sons Limited, a company of New Zealand, William Neil McIntosh, and George Elias Ataya, all of Auckland, New Zealand Application May 13, 1949, Serial No. 93,166

Claims priority, application New Zealand March 1, 1949

13 Claims. (Cl. 97—40)

This invention relates to rotary cultivators of the type mounted on a wheeled frame adapted to be caused to travel over areas to be cultivated, the rotary cultivators being driven either by means of a power take off from a tractor or the like used to tow the implement, or from a source of power thereon.

The object of the invention is to provide an improved form of rotary cultivator implement, which is distinguished from known forms of cultivators, in that it is capable of being used to cultivate the soil between plants in the same row, whereas known forms of rotary cultivators can only be used to cultivate soil between rows of plants, leaving the soil between plants in the same rows and closely adjacent said plants to be dealt with manually, so that the present invention has been devised to provide a rotary cultivator implement specially constructed for the treatment of portions of the ground which known forms of rotary cultivators are unable to deal with.

Broadly, the invention may be said to comprise a main frame provided with travelling wheels; a shaft mounted across said main frame; a rotary cultivator on an end of said shaft; gearing through which the latter is operated from a power shaft to rotate the cultivator; means for projecting the latter from a side of the implement, and for retracting same; and means for raising and lowering said rotary cultivator.

The shaft, on an end of which the cultivator is mounted, is telescopic, and is carried by a sliding frame, so that the rotary cultivator may be projected outwards, or be retracted, as required. When projected, the cultivator is caused to operate between the plants and, when retracted, it misses the plants. The lowering and raising of the rotary cultivator is effected by the slidable frame being mounted and reciprocable in a frame which is hinged at one side of and extends crossways of the main frame of the implement.

Provision is made by means of a gear box incorporated in the drive to the rotary cultivator, for driving the latter at a desired speed in relation to the travel of the implement, while provision is also made by means of a friction clutch for slip in the drive, necessary upon the cultivator striking an obstruction in the ground.

Figure 1:
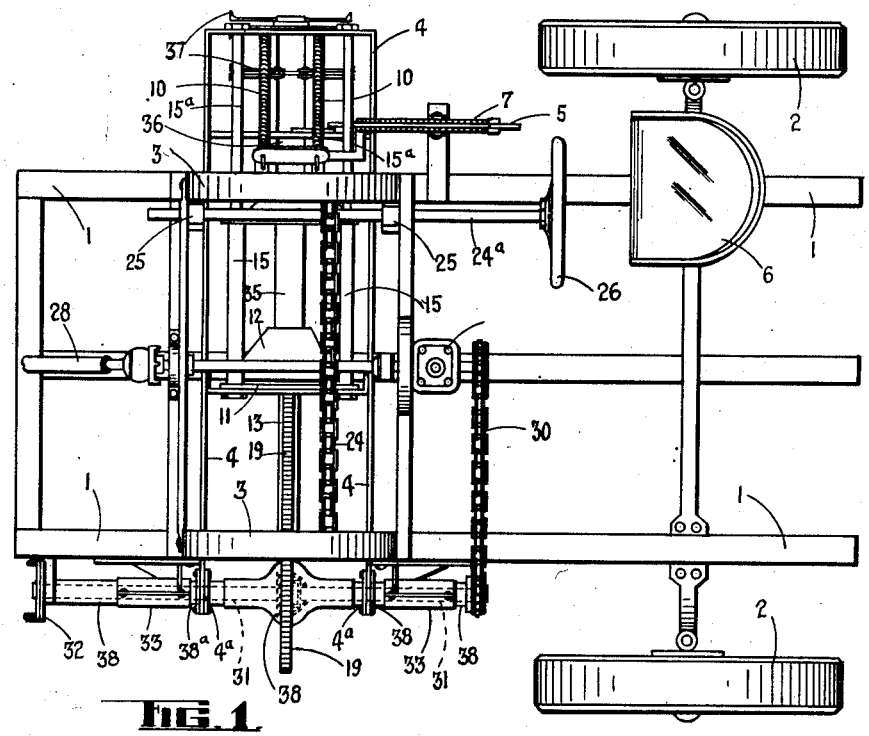
Figure 2:
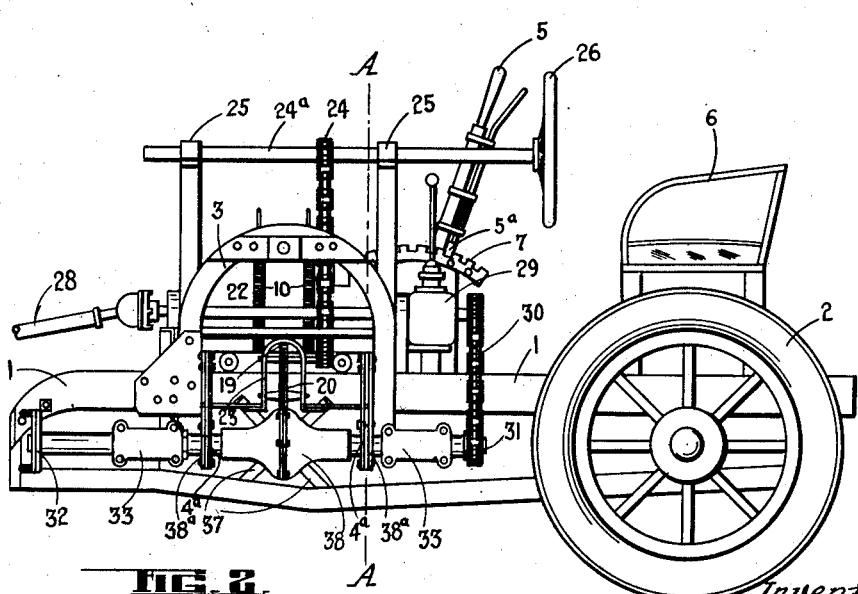
Figure 3:
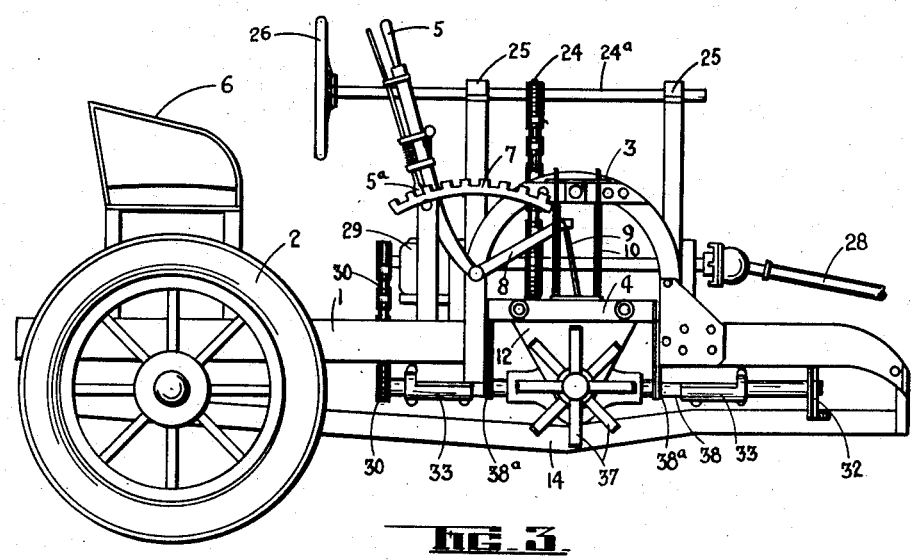
Figure 4:
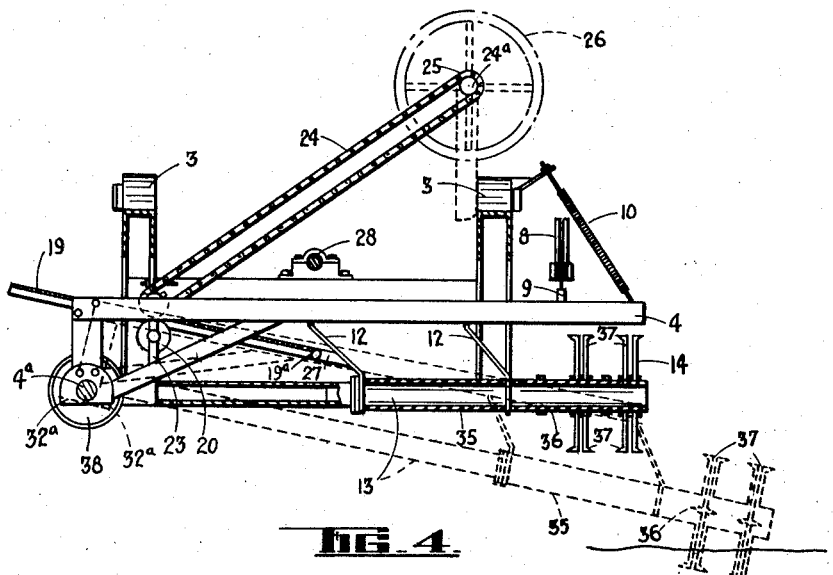

In order, however, that the invention may be clearly understood, it will be described in detail in conjunction with the accompanying drawings, which illustrate one practical embodiment thereof by way of example only, Figure 1 being a plan view, and Figures 2 and 3 side elevations of the improved implement, while Figure 4 is a cross sectional elevation of same on the line A—A, Figure 2, the dotted lines indicating the position of the rotary cultivator when extended from the implement and lowered for use, Figure 5 a plan view of the hinged or pivoted cross frame with the inner slidable frame therein which carries the telescopic drive shaft for the rotary cultivator, Figures 6 and 7 a part plan view, and a cross sectional view respectively, of an alternative arrangement of inner slidable frame, Figures 8 and 9 a view in side elevation, and an end elevation respectively, illustrating the mounting of the rack for imparting sliding movement to the slidable frame, and Figure 10 an illustration of an alternative arrangement of drive to the telescopic drive shaft which carries the rotary cultivator.

In the form of the invention illustrated, there is provided a main frame 1 adapted to travel on wheels 2, and to be towed by means of a draw bar of any suitable known form (not shown) from a tractor or the like, between rows of plants.

The side members of the main frame 1 have aligned arched portions 3 therein. A cross frame 4 is positioned within these aligned arched portions 3 transversely of the main frame 1 and forwardly of the rear wheels 2 and is pivotally mounted at 4a on one side of the main frame 1 to a drive shaft 31 (to be later described), so that it can be raised or lowered within said arched portions of the main frame. The raising and lowering of the cross frame 4 is accomplished by means of a hand lever 5 mounted on the main frame 1 within convenient reach of a driver's seat 6 thereon, and provided with a spring actuated pawl 5a which co-acts with a toothed quadrant 7 also on said main frame 1, the hand lever 5 being connected by means of an arm 8 and a link 9 with the hinged or pivoted cross frame 4 towards the end thereof distant from the hinges or pivots 4a.

A pair of tension springs 10 are attached at their lower ends to the outer end of the cross frame 4, that is, the end most remote from the pivotal mounting 4a and at which end a rotary cultivator 14 (to be later described) is located, and at their upper ends to the arched portions 3 of the main frame. These tension springs serve to absorb shock or take some of the weight of the hinged or pivoted cross frame 4 and parts carried thereby, when said frame 4 is being lowered, said springs 10 also assisting the raising movement of the frame 4 and its load.

Slidable endways in or on the hinged or pivoted cross frame 4, and crossways of the main frame 1, by either manually or power operated means, is an auxiliary frame 11 having depending therefrom brackets or members 12 which support or carry a telescopic drive shaft 13 having mounted thereon the rotary cultivator 14. If desired, a shield can be provided, over said cultivator 14.

The auxiliary frame 11 slidable as aforesaid, can be provided with tubes 15 adapted to slide on rods 15a on the hinged or pivoted cross frame 4 (Figs. 1 and 5) or said frame 11 can be slidably mounted in or on the hinged or pivoted cross frame, by means of rollers 16 on the slidable frame 11 running in guides or channel formations 17 forming part of the hinged or pivoted cross frame (Figs. 6 and 7), a back pressure roller 18 being mounted at the opposite angle to the rollers 16 on the side of the frame 11 to the rear of the rotary cultivator 14 to bear against a channel formation 17 and take the pressure set up by the forward travel of said rotary cultivator 14.

The inner frame 11 can be given sliding movement in the hinged or pivoted cross frame 4, to cause projection of the rotary cultivator 14 from the side of the implement, or to retract said cultivator 14 into the latter, by means of a toothed rack 19 connected with said inner frame 11, and having on its under side a web or rib slidable on or in a grooved or double flanged wheel 20, and having in mesh therewith above the wheel 20 a toothed pinion 21 on a shaft 22 mounted in a bracket or support 23 fitted in an arched portion 3 of the main frame 1, said shaft 22 being adapted to be driven per medium of a chain and sprocket drive 24 from a further shaft 24a mounted in a bracket or support 25 on the main frame 1, and provided with a hand operating wheel 26 within convenient reach of the driver's seat 6 aforesaid.

The toothed rack 19 aforesaid is pivotally connected at 19a with a lug 27 on one of the supporting brackets or members 12 for the telescopic drive shaft 13, to permit vertical movement between said rack 19 and the hinged or pivoted cross frame 4 with the inner frame 11 slidable thereon, due to said rack 19 and said frame 4 moving about different centres, i. e. the rack 19 moving about the wheel 20 and the frame 4 about the centres 4a, a degree of play also being allowed between the toothed rack 19 and its intermeshing pinion 21 for the same purpose, as the rack 19 turns about its supporting wheel 20.

The drive to the telescopic shaft 13 on which the rotary cultivator 14 is mounted, can be taken from the power take off of a tractor (not shown) in conventional manner through a telescopic power shaft 28 and one or more universal joints, a variable speed gear box 29, and chain gearing 30 to a drive snaft or shafts 31 at the side of the implement at which the cross frame 4 is hinged or pivoted, the axis of said shaft or shafts 31 being coincidental with the pivotal or hinged axis 4ᵃ of the hinged or pivoted cross frame 4, so that the latter can be lowered and raised without interfering with the drive through bevel or differential gearing and a universal joint to the rotary cultivator 14, a friction clutch 32 of conventional design being provided to permit slip under overload or blockage of the cultivator 14.

When differential gearing is employed, the housing 38 thereof is mounted in bearings 33 on the main frame 1, and the hinged or pivoted cross frame 4 is secured to flanges 38ᵃ on said housing 38 so that the latter and the hinged or pivoted cross frame 4 turn together about the aligned shafts 31 of the gearing, one of which shafts 31 is driven from the gear box 29 through the chain gearing 30 aforesaid, and between the other shaft 31 of which and the main frame 1 the friction clutch 32 is interposed, the telescopic drive shaft 13 to the rotary cultivator 14 being at right angles to said aligned shafts 31.

When bevel gearing 34 (Fig. 10) is employed, the hinged or pivoted cross frame 4 hinges or pivots about the shaft 31 driven from the gear box 29 by the chain gearing 30, the friction clutch 32 being interposed in the drive between the bevel gearing 34 and the rotary cultivator 14.

The portion of the telescopic drive shaft 13 to the rotary cultivator 14, which is slidable within the other shaft portion, is flat sided and operates within a correspondingly formed outer shaft portion, so that a driving connection is always maintained between said shaft portions.

The tubular portion of the telescopic drive shaft 13 to the rotary cultivator 14, is mounted in a tubular bearing 35 secured in the brackets or members 12 which depend from the inner slidable frame 11, and said tubular portion of said shaft 13 has detachably secured on its outer end as by means of cross pins, the rotary cultivator 14 which can comprise a hub tube 36 having radial cutters 37 with right angle outer ends or blades of other suitable known formation secured to flanges thereon.

Provision can also be made by conventional means for towing an ordinary cultivator, or a drag implement of any suitable known form, behind the implement, to deal with soil between the rows of plants, or said ordinary cultivator or drag implement can be incorporated in or be attached to the rotary cultivator implement described herein.

What we do claim and desire to obtain by Letters Patent of the United States of America is:

1. A cultivator implement comprising a wheeled main frame and having a power shaft thereon, a cross frame pivoted at one side of the main frame and extending transversely of the latter, a telescopic driven shaft pivotally mounted at one end to said one side of the main frame and positioned longitudinally of the cross frame, gearing interconnecting the power and the driven shafts, a rotary cultivator on the other end of the driven shaft, means for variably spacing the cultivator between extreme positions in opposite directions relative to said one side of the implement including means for contracting or extending said telescopic driven shaft depending upon the direction of movement of said cultivator, and means for raising and lowering said cross frame.

2. A cultivator implement comprising a wheeled main frame and having a power shaft thereon, a cross frame pivoted at one side of the main frame and extending transversely of the latter, an auxiliary frame mounted on the cross frame and slidable longitudinally of the latter, a telescopic driven shaft comprised by at least two slidable sections constituting inner and outer sections, means pivoting said inner section to said one side of the main frame, said telescopic driven shaft extending longitudinally of the cross and auxiliary frames, supporting members on the auxiliary frame connected to and supporting said outer slidable section of the telescopic driven shaft, transmission means interconnecting the power shaft and the telescopic driven shaft, a rotary cultivator on the outer end of the outer section of the driven shaft, means for variably spacing the cultivator between extreme positions in opposite directions relative to said one side of the implement including means for sliding the auxiliary frame with respect to the cross frame and thereby contracting or extending said telescopic driven shaft depending upon the direction of movement of said auxiliary frame, and means for raising and lowering said cross and auxiliary frames.

3. A cultivator implement comprising a wheeled main frame and having a power shaft thereon, a cross frame pivoted at one side of the main frame and extending transversely of the latter, an auxiliary frame mounted on the cross frame and slidable longitudinally of the latter, a telescopic driven shaft comprised by at least two slidable sections constituting inner and outer sections, means pivoting said inner section to said one side of the main frame, said telescopic driven shaft extending longitudinally of the cross and auxiliary frames, supporting members on the auxiliary frame connected to and supporting said outer slidable section of the driven shaft, power transmission means connecting said power shaft with said driven shaft, a rotary cultivator on the outer end of the outer section of the driven shaft, a rack connected at one end to the auxiliary frame, a pinion rotatably mounted on the main frame and meshing with said rack for moving the same thus variably spacing the cultivator between extreme positions relative to said one side of the main frame, means for rotating the pinion to move the rack whereby the movement of the rack slides the auxiliary frame with respect to the cross frame thereby contracting or extending the telescopic driven shaft depending upon the direction of movement of said rack, and means for raising and lowering said cross and auxiliary frames.

4. A cultivator implement comprising a wheeled main frame and having a power shaft thereon, a cross frame pivoted at one side of the main frame and extending transversely of the latter, an auxiliary frame mounted on the cross frame and slidable longitudinally of the latter, a telescopic driven shaft comprised by at least two slidable sections constituting inner and outer sections, means pivoting said inner section to said one side of the main frame, said telescopic driven shaft extending longitudinally of the cross and auxiliary frames, supporting members on the auxiliary frame connected to and supporting said outer slidable section of the driven shaft, a rotary cultivator on the outer end of the outer section of the driven shaft, power transmission means connecting said power shaft with said driven shaft a rack connected at one end to the auxiliary frame, a supporting roller on the main frame and mounting said rack, a pinion rotatably mounted on the main frame and meshing with said rack for moving the same for variably spacing the cultivator between extreme positions in opposite directions relative to said one side of the implement, the movement of the rack sliding the auxiliary frame with respect to the cross frame and thereby contracting or extending the telescopic driven shaft depending upon the direction of movement of said rack, a hand wheel rotatably mounted on said main frame, a drive between said hand wheel and the pinion on the main frame, and means for raising and lowering said cross and auxiliary frames.

5. A cultivator implement comprising a wheeled main frame and having a power shaft thereon, a cross frame pivoted at one side of the main frame and extending transversely of the latter, an auxiliary frame mounted on the cross frame and slidable longitudinally of the latter, tubes longitudinally positioned on the cross frame and rods longitudinally positioned on the auxiliary frame and slidably received within said tubes, a telescopic driven shaft comprised by at least two slidable sections constituting inner and outer sections, means pivoting said inner section to said one side of the main frame, said shaft extending longitudinally of the cross and auxiliary frames, supporting members on the auxiliary frame mounting said outer slidable section of the driven shaft, a rotary cultivator on the outer end of the outer section of the driven shaft, means for variably spacing the cultivator between extreme positions in opposite directions relative to said one side of the implement including means for sliding the auxiliary frame with respect to the cross frame and thereby contracting or extending said telescopic driven shaft depending upon the direction of movement of said auxiliary frame, and means for raising and lowering said cross and auxiliary frames.

6. A cultivator implement comprising a wheeled main frame and having a power shaft thereon, a cross frame comprised in part by opposed channel bars pivoted at one side of the main frame and extending transversely of the latter, an auxiliary frame mounted on the cross frame and slidable longitudinally of the latter, vertically positioned rollers on the auxiliary frame and received in the opposed channels bars of the cross frame, a horizontally positioned back pressure roller on the auxiliary frame and received in the rear channel bar of the cross frame, a telescopic driven shaft comprised by at least two slidable sections constituting the inner and outer sections, means pivoting the inner section to said one side of the main frame, said shaft extending longitudinally of the cross and auxiliary frames, supporting members on the auxiliary frame mounting said outer slidable section of the driven shaft, a rotary cultivator on the outer end of the outer section of the driven shaft, means for variably spacing the cultivator between extreme positions in opposite directions relative to said one side of the implement including means for sliding the auxiliary frame with respect to the cross frame and thereby contracting or extending said telescopic driven shaft depending upon the direction of movement of said auxiliary frame, and means for raising and lowering said cross and auxiliary frames.

7. A cultivator implement comprising a wheeled main frame and having a power shaft thereon, said main frame being comprised in part by side bars having transversely aligned arch sections therein, a cross frame pivoted at one side of the main frame and extending transversely through the arched sections of the latter, spring supporting means connected to the main frame and to the cross frame adjacent the end opposite the pivotal mounting, an auxiliary frame mounted on the cross frame and slidable longitudinally of the latter, a telescopic driven shaft comprised by at least two slidable sections constituting inner and outer sections, means pivoting the inner section to said one side of the main frame, said shaft extending longitudinally of the cross and auxiliary frames, supporting members on the auxiliary frame mounting said outer slidable section of the driven shaft, a rotary cultivator on the outer end of the outer section of the driven shaft, means for variably spacing the cultivator between extreme positions in opposite directions relative to said one side of the implement including means for sliding the auxiliary frame with respect to the cross frame and thereby contracting or extending said telescopic driven shaft depending upon the direction of movement of said auxiliary frame, and means mounted on the main frame and connected to the cross frame adjacent the end opposite the pivoted end for raising and lowering the cross and auxiliary frames.

8. A cultivator implement comprising a wheeled main frame and having a power shaft thereon, said main frame being comprised in part by side bars having transversely aligned arch sections therein, a cross frame pivoted at one side of the main frame and extending transversely through the arched sections of the latter, spring supporting means connected to the main frame and to the cross frame adjacent the end opposite the pivotal mounting, an auxiliary frame mounted on the cross frame and slidable longitudinally of the latter, a telescopic driven shaft comprised by at least two slidable sections constituting inner and outer sections, means pivoting the inner section to said one side of the main frame, said shaft extending longitudinally of the cross and auxiliary frames, supporting members on the auxiliary frame mounting the outer slidable section of the driven shaft, a rotary cultivator on the outer end of the outer section of the driven shaft, means for variably spacing the cultivator between extreme positions in opposite directions relative to said one side of the implement including means for sliding the auxiliary frame with respect to the cross frame and thereby contracting or extending said telescopic drive shaft depending upon the direction of movement of said auxiliary frame, a hand lever pivotally mounted on the main frame and carrying a spring biased pawl, a quadrant on the main frame adjacent the hand lever and receiving said pawl, an arm on the hand lever, and a link connecting the arm to the cross frame adjacent the end opposite the pivotal mounting for raising and lowering the cross and auxiliary frames.

9. In a cultivator implement comprising a wheeled main frame and having a power shaft thereon, a drive shaft along one side of the main frame, a transmission interconnecting the power and the drive shafts, a cross frame pivoted on the drive shaft and extending transversely of the main frame, an auxiliary frame mounted on the cross frame and slidable longitudinally of the latter, a telescopic driven shaft comprised by at least two slidable sections constituting inner and outer sections, means pivoting the inner section to said one side of the main frame, said shaft extending longitudinally of the cross and auxiliary frames, gearing interconnecting the drive and driven shafts, supporting members on the auxiliary frame mounting said outer slidable section of the driven shaft, a rotary cultivator on the outer end of the outer section of the driven shaft, means for variably spacing the cultivator between extreme positions in opposite directions relative to said one side of the implement including means for sliding the auxiliary frame with respect to the cross frame and thereby contracting or extending said telescopic driven shaft depending upon the direction of movement of said auxiliary frame, and means for raising and lowering said cross and auxiliary frames.

10. A cultivator implement comprising a wheeled main frame and having a power shaft thereon, a variable speed gearing connected to said power shaft, a drive shaft in two sections along one side of the main frame, a transmission interconnecting the change speed gearing and one section of said drive shaft, a differential gearing between the two sections of the drive shaft, a friction clutch between the other section of the drive shaft and the main frame, a cross frame pivoted on the two sections of the drive shaft and extending transversely of the main frame, an auxiliary frame mounted on the cross frame and slidable longitudinally of the latter, a telescopic driven shaft comprised by at least two slidable sections constituting inner and outer sections, means connecting one end of said inner section to said differential gearing for rotation from the drive shaft, said driven shaft extending longitudinally of the cross and auxiliary frames, supporting members on the auxiliary frame mounting said outer slidable section of the outer section of the driven shaft, a rotary cultivator on the outer end of the outer section of the driven shaft, means for variably spacing the cultivator between extreme positions in opposite directions relative to said one side of the implement including means for sliding the auxiliary frame with respect to the cross frame and thereby contracting or extending said telescopic driven shaft dependent upon the direction of movement of said auxiliary frame, and means for raising and lowering said cross and auxiliary frames.

11. A cultivator implement comprising a wheeled main frame, a drivable variable speed gearing carried by the frame and including an output shaft, a drive shaft along one side of the main frame, a transmission interconnecting the output shaft of the variable speed gearing and said drive shaft, a cross frame pivoted on said drive shaft and extending transversely of the main frame, an auxiliary frame mounted on the cross frame and slidable longitudinally of the latter, a telescopic driven shaft comprised by at least two slidable sections positioned longitudinally of the cross and auxiliary frames, bevel gearing mounted in part on said drive shaft and a friction clutch intermediate the bevel gearing and connecting the latter to one end of said driven shaft, supporting members on the auxiliary frame mounting one slidable section of the driven shaft, a rotary cultivator on the other end of the driven shaft, means for variably spacing the cultivator between extreme positions in opposite directions relative to said one side of the implement including means for sliding the auxiliary frame with respect to the cross frame and thereby contracting or extending said telescopic driven shaft dependent upon the direction of movement of said auxiliary frame, and means for raising and lowering said cross and auxiliary frames.

12. A cultivator implement comprising a wheeled main frame and having a power shaft thereon, a cross frame pivoted at one side of the main frame and extending transversely of the latter, an auxiliary frame mounted on the cross frame and slidable longitudinally of the latter, a telescopic driven shaft comprised by a first tubular member pivoted at one side of the main frame and positioned longitudinally of the cross and auxiliary frames and a second tubular member telescopically engaging said first tubular member, supporting members on the auxiliary frame mounting the second tubular member of the telescopic driven shaft, said second tubular member having flanges thereon, radial cutters secured to the flanges on said second tubular member, means for variably spacing the radial cutters between extreme positions in opposite directions relative to said one side of the implement including means for sliding the auxiliary frame with respect to the cross frame and thereby contracting or extending said telescopic driven shaft dependent upon the direction of movement of the auxiliary frame, and means for raising and lowering said cross and auxiliary frames.

13. A cultivator implement comprising a mobile frame having a longitudinal axis, a drive shaft extending in parallelism with said axis, supplementary frame means extending transversely of the axis of the drive shaft and including supporting means reciprocably mounted for movement in a direction perpendicular to said drive shaft, extensible driven shaft means operably coupled with said drive shaft and supported at least in part by said supporting means, said driven shaft being capable of angular movement about the axis of the drive shaft, means mounting the supplementary frame means for pivoting movement about the axis of the drive shaft, a rotary cultivator carried by said extensible shaft means, means for selectively reciprocating said supporting means and thereby extending or retracting said driven shaft and the cultivator carried thereby relative to the longitudinal axis of the mobile frame to project or retract said cultivator relative to said mobile frame, and means for selectively raising and lowering said supplementary frame.

References Cited in the file of this patent

UNITED STATES PATENTS

| Number | Name | Date |
|---|---|---|
| 1,684,861 | Dirschauer | Sept. 18, 1928 |
| 2,206,283 | Jacobs et al. | July 2, 1940 |
| 2,539,174 | Baideme et al. | Jan. 23, 1951 |
| 2,630,746 | Thompson | Mar. 10, 1953 |